(12) United States Patent  (10) Patent No.: US 6,471,151 B1
Kita et al.  (45) Date of Patent: Oct. 29, 2002

(54) REEL SPRING FOR USE OF A MAGNETIC TAPE CASSETTE AND A MAGNETIC TAPE CASSETTE

(75) Inventors: Akihisa Kita; Tatsuya Yamaguchi, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/830,330

(22) PCT Filed: Oct. 27, 1999

(86) PCT No.: PCT/JP99/05932

§ 371 (c)(1),
(2), (4) Date: Apr. 26, 2001

(87) PCT Pub. No.: WO00/25315

PCT Pub. Date: May 4, 2000

(30) Foreign Application Priority Data

Oct. 27, 1998 (JP) ............................................. 10-305339

(51) Int. Cl.$^7$ ............................................. G11B 23/087
(52) U.S. Cl. .................... 242/345.2; 360/132; 267/158; 267/160
(58) Field of Search ...................... 242/345.2; 360/132; 267/158, 160

(56) References Cited

U.S. PATENT DOCUMENTS 5,181,153 A    1/1993  Nishimura .................. 360/132

FOREIGN PATENT DOCUMENTS

| EP | 0 225 734 | 6/1987 |
| GB | 2 269 360 | 2/1994 |
| GB | 2 283 961 | 5/1995 |
| WO | 95/15560 | 6/1995 |

OTHER PUBLICATIONS

International Search Report.
Patent Abstracts of Japan 11149746.
Patent Abstracts of Japan 07296550.

*Primary Examiner*—John Q. Nguyen
(74) *Attorney, Agent, or Firm*—Sughrue Mion, PLLC

(57) ABSTRACT

The reel spring for use in a magnetic tape cassette comprises a fixing portion which is fixed to a boss of a cassette case by means of a boss hole, an arm portion which forces a reel in an axial direction of rotation and a bending portion provided between the fixing portion and the arm portion in an L-like shape. The ratio of a length of the fixing portion of the reel spring to a height of the boss is 4.0 or more. The length of the fixing portion is longer than that of the arm portion by 1 mm to 5 mm. The magnetic tape cassette employs the reel spring which is capable of enhancing production efficiency in fabricating the magnetic tape cassette while maintaining a specified force of the reel spring.

9 Claims, 4 Drawing Sheets

REEL SPRING FOR USE OF A MAGNETIC TAPE CASSETTE AND A MAGNETIC TAPE CASSETTE

TECHNICAL FIELD

The present invention relates to a reel spring of a magnetic tape cassette for forcing in a direction to a reel around which a magnetic tape is wound and which is rotatably provided in a cassette case. The present invention also relates to a magnetic tape cassette using the reel spring.

BACKGROUND ART

In audio set equipment, video set equipment or the like, a magnetic tape cassette which allows a magnetic tape wound around a pair of reels to run in a cassette case to perform recording and replaying has generally been used.

In such magnetic tape cassette, a pair of reel springs are provided in the cassette case to prevent the pair of reels around which a magnetic tape is wound from displacing in an axial direction of rotation and to allow the tape to run smoothly whereupon the pair of reels are forced on in the axial direction of rotation in the cassette case by the pair of reel springs each other.

FIG. 3 shows a part of a digital video cassette L type (DVC-L) as a digital video cassette for business use which has such reel springs.

As shown in FIG. 3, the digital video cassette 30 comprises an upper half 32 of a cassette case, a pair of reels 34 around which a magnetic tape is wound and which are rotatably provided in the cassette case and a pair of reel springs which are each a flat plate in an approximately rectangular shape having a bending portion in a midway in a longitudinal direction to form an L-like shape, as well as other members not shown in the figure such as a lower half as a part of the cassette case, an outer lid, an upper lid and an inner lid which constitute a lid to cover an opening in the front of the cassette case, various springs and the like.

The reel spring 36, as shown in FIGS. 4A and 4B, has a fixing portion 36a which is fixed to the cassette case to form a fixing end, an arm portion 36b which forces on the aforementioned reel in the axial direction of rotation and a bending portion 36c provided between the fixing portion 36a and the arm portion 36b.

The fixing portion 36a has a boss hole 46. The boss hole 46 is provided so as to fix the reel spring 36 to a reel spring provision portion 40 which is provided in the upper half 32 of the cassette case shown in FIG. 3.

An end of the reel spring 36 is chamfered off in a triangular shape and the other end thereof in a circular shape.

A length of the arm portion 36b, namely a length from the bending portion 36c to an edge of the arm portion 36b, is needed to be long within an extent enough for keeping an urging force consistently, for reducing variation of the urging force by device of a variation of dimension of the reel spring 36 inherent to mass production of reel spring 36 which forces a reel 34 with a specified urging force, exemplified by a variation of bending angel of bending portion 36c.

Moreover, ratio of a length of the fixing portion 36a, which is defined by a length from the bending portion 36c to an edge of the fixing portion 36a, to the length of the arm portion 36a is preferred to be larger within an extent enough for keeping the specified urging force consistently, though not necessarily being over 1.0, because of preventing the fixing portion 36a which should be in contact with a bottom surface of the upper half 32 from being deformed and partially lifted when the reel spring 36 forces on the reel 34, as shown in FIG. 5. Therefore, the length of the arm portion 36b is designed to be longer than that of the fixing portion 36a, for example 5 mm longer.

The diameter of the boss hole 46 of the fixing portion 36a is formed larger than that of an upper half boss 42 so that, when the reel spring 36 is provided to a reel spring provision portion 40, it gets regulated in a lateral direction by reel spring provision portion guides 44 and the reel spring is easily engaged with the upper half boss 42 of the upper half 32.

When the digital video cassette 30 is assembled, such reel spring 36 is provided to the reel spring provision portion 40 of the upper half 32 by reel spring supply device not shown in the figure, is regulated in the lateral direction by reel spring provision portion guides 44 and mounted in a manner that the boss hole 46 is engaged with the upper half boss 42 on the upper half 32. Thereafter, the reel spring 36 is transported to a welding step of a cassette assembly line in which a top of the upper half boss 42 engaged with the boss hole 46 of the reel spring 36 is melted and the reel spring is welded to the upper half 32.

In this occasion, as described above, in order to prevent the fixing portion 36a of the reel spring 36 welded to the upper half 32 from being deformed and partially lifted from the bottom surface of the reel spring provision portion 40 (see FIG. 5), the length of the arm portion 36b is designed longer than that of the fixing portion 36a so that the arm portion 36b contacts the bottom surface of the reel spring provision portion 40 in relation with a position of the gravity center and, accordingly, the fixing portion 36a comes to be in a lifted state. However, in a case in which the digital video cassette is a small-sized one for private use (DVC-S type) where a ratio of the length of the fixing portion 36a to a height of the upper half boss 42 is less than 4.0, as shown in FIG. 6, the boss hole 46 of the fixing portion 36a is not released (disengaged) from the upper half boss 42 of the upper half 32 so that problems such as complexity of welding operation or of transportation operation, decrease of assembling work efficiency and so forth do not occur.

In contrast, in another case in which the digital video cassette is a large-sized one for business use where the ratio is 4.0 or more as L type (DVC-L), the reel spring 36 should be longer longitudinally in accordance with the size of the digital video cassette and. As a result, when the length of the reel spring 36 comes to be longer, the length of the arm portion 36b, as well as that of the fixing portion 36a, becomes longer even if the ratio of the arm portion 36b to the fixing portion 36 and the bending angle of the bending portion 36c are not changed so that, even when the fixing portion 36a of the reel spring 36 is mounted on the reel spring provision portion 40 in a manner that the upper half boss 46 of the upper half 32 is engaged with the boss hole 46 of the reel spring 36, as shown in FIG. 7, the boss hole 46 of the fixing portion 36a is likely to be released from the upper half boss 42 on the upper half 32. Therefore, during the transportation to the welding step, instead of being laterally regulated with the reel spring provision portion guides 44, the reel spring 36 bounces or slides in a disposal direction either of the right or left ridge of the reel spring provision portion guides 44, by vibration or the like to be dislocated from the appropriate position. Moreover, a trouble occurs in a welding operation in that, at the time of welding, the welding operation must be performed by pressing the fixing portion 36a down to the bottom surface of the reel spring provision portion 40 so that it may not be lifted up.

To cope with these problems, it is conceivable to provide a device to press down the reel spring 36 so that the reel spring 36 may not be dislocated from the reel spring provision portion 40 during the transportation. However, this causes transportation operation complicate.

Even if the device which presses down the reel spring 36 is provided during the transportation to allow the reel spring 36 to remain in an appropriate position, it is necessary to weld the upper half boss 42 with an ultrasonic welder or the like while keeping the reel spring 36 in a specified set condition preventing the fixing portion 36a from being lifted up at the welding step. This causes to complicate welding step as well as welding operation at the welding step thereby leading to decrease of an assembly efficiency.

It is also conceivable that the height of the upper half boss 42 is designed to be increased; however, if the height of the upper half boss 42 is increased, welding volume needed for fixing the reel spring 36 to the upper half boss 42 is increased whereupon welding time becomes longer, which leads to decrease of an efficiency of welding process.

It is also conceivable that the length of the fixing portion 36a is designed to be decreased to an extent that the boss hole 46 is not released from the upper half boss 42 on the upper half 32; however, the length of the arm portion 36b is so long that the reel spring 36 can not obtain a specified force acting on the reel 34.

Its is further conceivable that the bending angle of the bending portion 36c of the reel spring 36 is brought to be shorter; however, the same problem as the above occurs.

Accordingly, it is an object of the present invention to solve the aforementioned problems and to provide a reel spring of a magnetic tape cassette having the ratio of a length of fixing portion to a height of an upper half boss being 4.0 or more and a magnetic tape cassette using the reel spring, wherein, when the reel spring is supplied to a cassette case, transported and welded during the assembly of the magnetic tape cassette, the reel spring can not be dislocated from an appropriate position in the cassette case, solves the complexity occurring at the welding step of the reel spring and can improve production efficiency over the prior art.

DISCLOSURE OF THE INVENTION

The present invention provides a reel spring for use of a magnetic tape cassette having a cassette case and a pair of reels wound with a magnetic tape and rotatably provided in the cassette case, the reel spring for forcing one of the pair of reels in an axial direction of rotation, comprising:

a fixing portion for being fixed to the cassette case, the fixing portion having a boss hole for being engaged to a boss of the cassette case;

an arm portion which forces on the one of the reels in the axial direction of rotation; and a bending portion to form an L-like shape provided between the fixing portion and the arm portion, wherein a ratio of a length of the fixing portion to a height of the boss is equal to or more than 4.0, and wherein the length of the fixing portion is longer than a length of the arm portion by from 1 mm to 5 mm.

It is preferable that the length of the fixing portion is longer than that of the arm portion by from 2 mm to 3 mm.

It is preferable that a position of gravity center of the reel spring is positioned at least in a region of the fixing portion from the bending portion as a border.

It is preferable that at lease one of ends of the fixing portion and the arm portion is chamfered off.

It is preferable that the reel spring is employed in a pair, and each reel spring of the pair forces each of the pair of reels.

The present invention also provides a magnetic tape cassette, comprising:

a cassette case;

a pair of reels wound with a magnetic tape and rotatably provided in the cassette case; and a pair of reel springs disposed to the cassette case for forcing each of the pair of reels in an axial direction of rotation, the cassette case having a pair of bosses for disposal of the pair of reel springs, each of the pair of reel springs comprising:

a fixing portion for being fixed to the cassette case, the fixing portion having a boss hole for being engaged to one of the pair of bosses of the cassette case to form an fixing end when it is fixed to the cassette case;

an arm portion for forcing on each of the reels in the axial direction of rotation; and a bending portion to form an L-like shape provided between the fixing portion and the arm portion, wherein a ratio of a length of the fixing portion to a height of the boss is equal to or more than 4.0, and wherein the length of the fixing portion is longer than a length of the arm portion by from 1 mm to 5 mm.

BEST MODE FOR CARRYING OUT THE INVENTION

A reel spring of a magnetic tape cassette and a magnetic tape cassette using the same according to the present invention will now be described in detail with reference to a preferred embodiment of a reel spring of a digital video cassette shown in the accompanying drawings.

Figure 3:
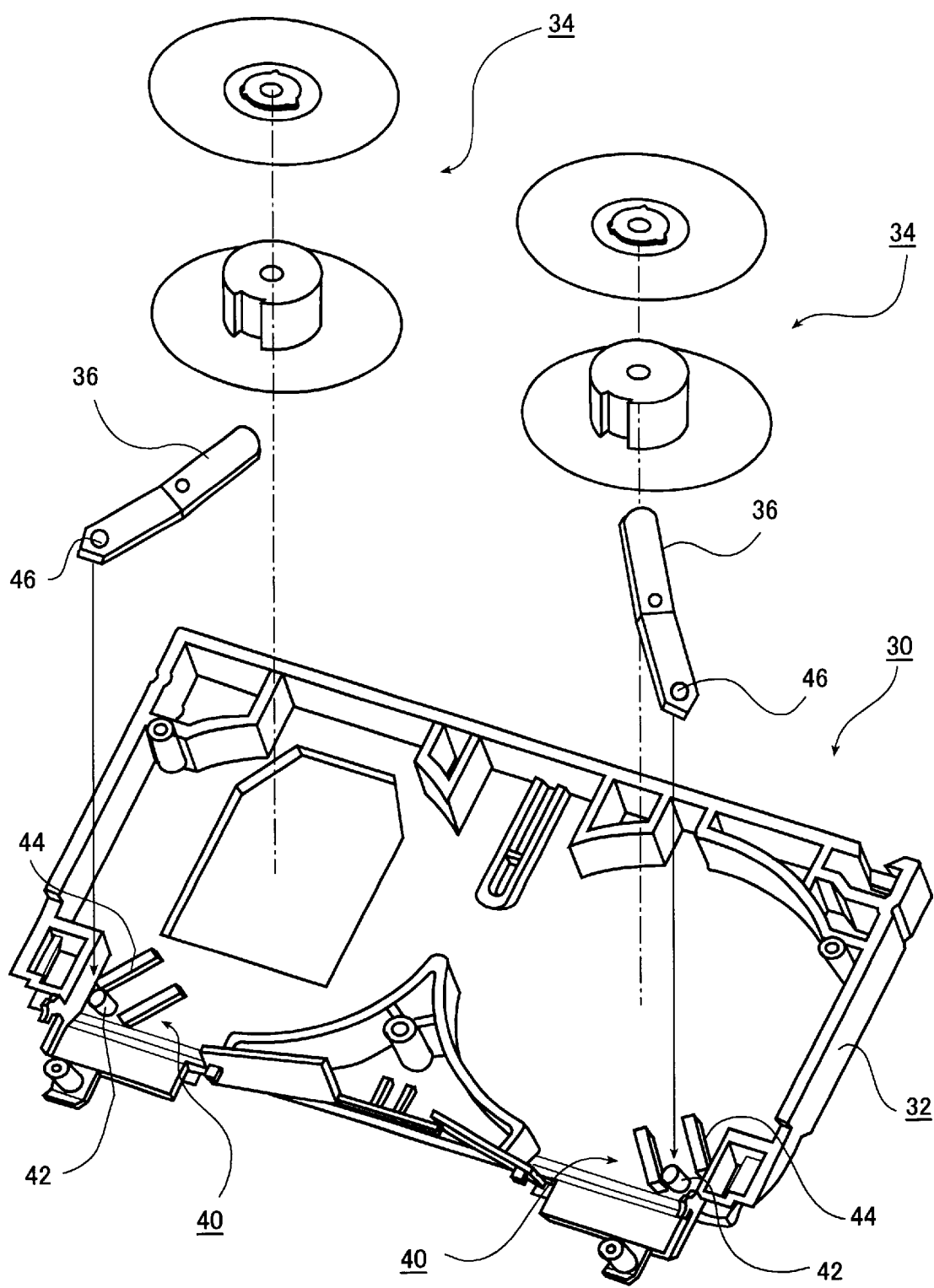
FIG. 3 is an disassembled perspective view showing primary portions of an example of a conventional magnetic tape cassette.
Figure 4A:
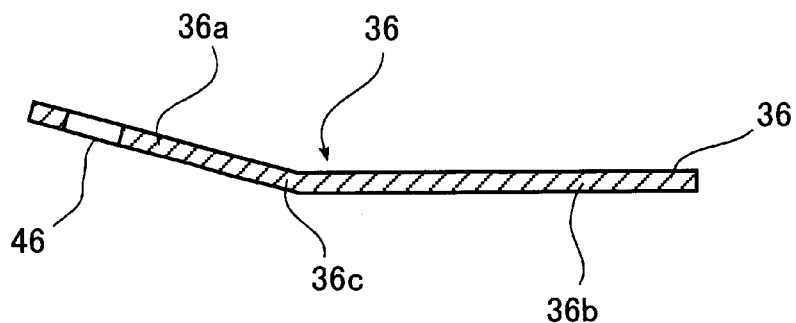
FIG. 4A is a cross-sectional view showing an example of a reel spring to be employed in a conventional magnetic tape cassette and FIG. 4B is a plan view of the reel spring shown in FIG. 4A.
Figure 4B:
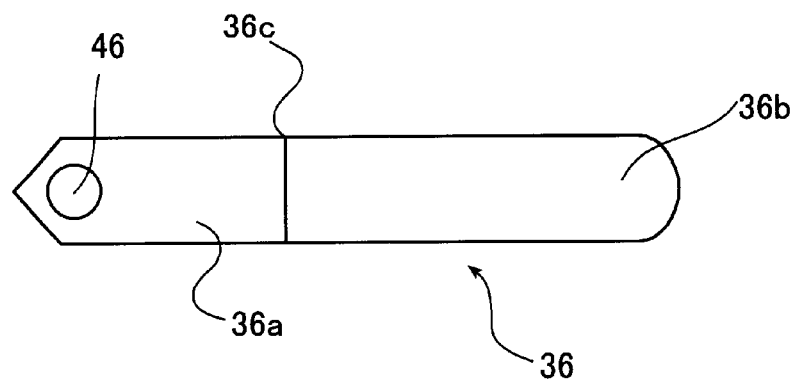

The magnetic tape cassette of the present invention to which the reel spring of the magnetic tape cassette according to the present invention is applied has same construction as a conventional magnetic tape cassette has except for the reel spring. Therefore, in the explanation below with reference to a magnetic tape cassette to which the reel spring according to the present invention shown in FIGS. 1A and 1B is applied, the digital video cassette 30 as an embodiment of the conventional magnetic tape cassette shown in FIG. 3 is referred to and the same reference numerals except for the reel spring 36 are used.

Figure 1A:
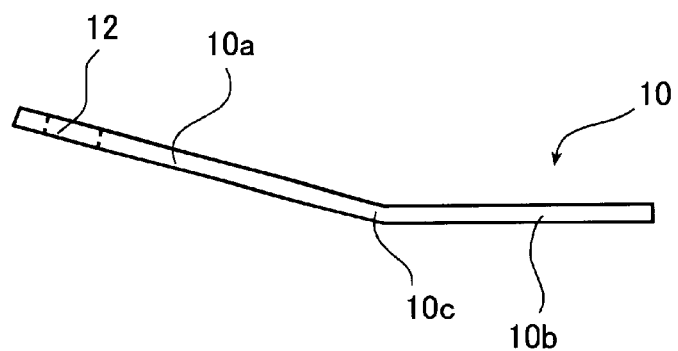
FIG. 1A is a side-elevational view of a reel spring of a digital video cassette as an embodiment of a reel spring of a magnetic tape cassette of the present invention and FIG. 1B is a plan view of the reel spring shown in FIG. 1A.
Figure 1B:
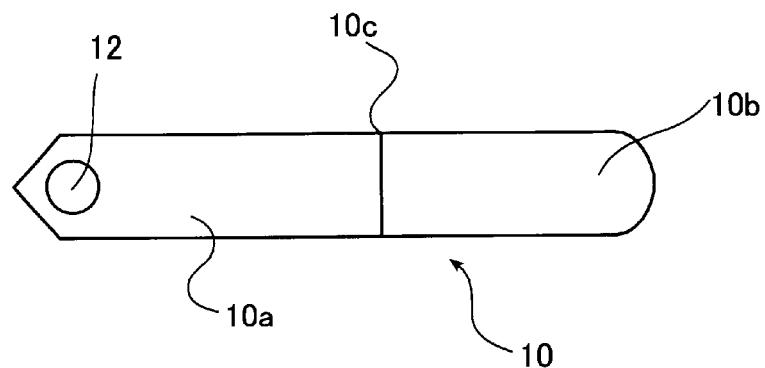

FIGS. 1A and 1B show a reel spring of a digital video cassette as an embodiment of a reel spring of a magnetic tape cassette of the present invention.

The reel spring 10 shown in FIGS. 1A and 1B comprises a fixing portion 10a which forms a fixing end when it is fixed to a cassette case having an upper half boss 42, an arm portion 10b which forces on the aforementioned reel in an axial direction of rotation and a bending portion 10c provided between the fixing portion 10a and the arm portion 10b to form an L-shape. The fixing portion 10a has a ratio of its own length to the upper half boss 42 of 4.0 or more.

The fixing portion 10a and the arm portion 10b are separated by the bending portion 10c as a border.

As shown in FIGS. 1A and 1B, the fixing portion 10a has a boss hole 12 for fixing the reel spring 10 to a reel spring provision portion 40. One end of the reel spring is chamfered off in a triangular form and the other end in a circular form.

In the reel spring 10, the bending portion 10c is designed in a manner that the length of the fixing portion 10a is longer than the that of the arm portion by 1 mm to 5 mm; this is characteristic of the present invention.

Characteristics of a material to be employed to the reel spring 10 are not limited in any way, but SUS 304 is preferably used. The bending angle of the bending portion l0c and the plate thickness of the reel spring 10 are not limited in any way, but it is preferable to set them as degrees of freedom of design so as to be able to keep the urging force to be obtained within a range of a specified amount even if the position of the bending portion 10c is designed to be modified to change the length of the arm portion 10b.

The reason why the length of the fixing portion 10a is longer than that of the arm portion 10b by 1 mm to 5 mm can be explained as follows:

The reel spring 10 is supplied one by one to an appropriate position and mounted thereon in a reel spring provision portion 40 on an upper half 32 with a reel spring provision device. The appropriate position is referred to as a position which is regulated by reel spring provision portion guides 44 which comprise a pair of ridges provided in accordance with the plate width of the reel spring 36 and to which the reel spring is secured by engaging an upper half boss 42 provided in the reel spring provision portion 40 to the boss hole 12.

Figure 2:
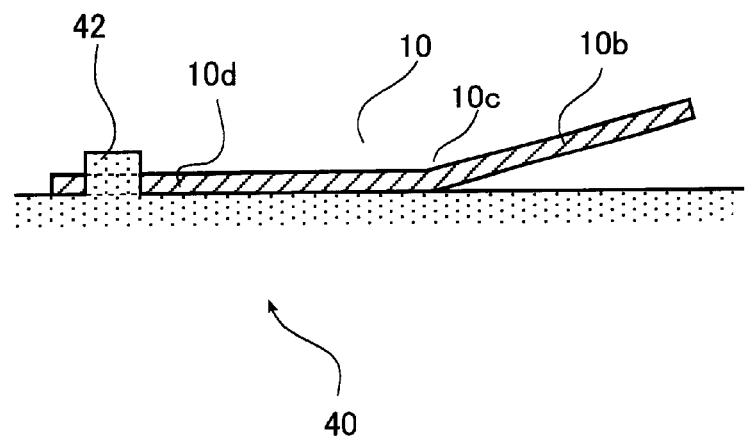
FIG. 2 is a cross-sectional schematic view showing a condition of the reel spring in which the reel spring for the digital video cassette shown in FIG. 1A is provided in a cassette case.

According to the present invention, since the length of the fixing portion 10a is longer than that of the arm portion 10b and a position of a gravity center of the reel spring 10 is located in the region of the fixing portion 10a, when the reel spring is provided in an appropriate position, as shown in FIG. 2, the whole area of the fixing portion 10a closely contacts the bottom surface of the reel spring provision portion 40 and moreover the reel spring 10 is firmly fixed to the upper half boss 42 without being released therefrom.

Figure 7:
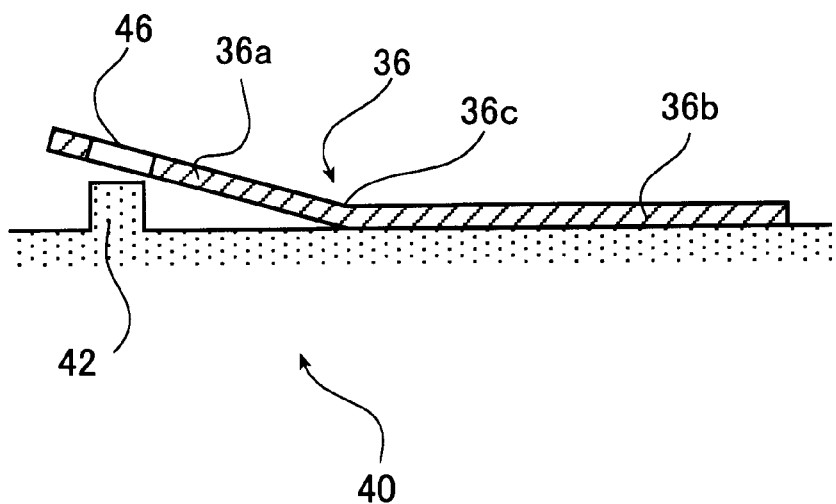
FIG. 7 is a cross-sectional schematic view showing a condition of a reel spring in which the reel spring of DVC-L type shown in FIG. 4A is provided in a cassette case.

On the other hand, in the conventional reel spring 36, since the length of the arm portion 36b is longer than that of the fixing portion 36a, the position of the gravity center is located in the region of the arm portion 36b so that, as shown in FIG. 7, the fixing portion 36a is lifted up from the bottom surface of the reel spring provision portion 40 and moreover is released from the upper half boss 42.

In such case, the reel spring 36 is easily dislocated from the appropriate position by vibration or the like during the transportation to the welding step of the reel spring as described above so that it is necessary to place the reel spring back to the appropriate position again. Moreover, in the welding step, the reel spring with its lifted fixing portion 36a is necessary to be held during the welding step in a manner that the whole area of the fixing portion 36a keeps contact with the bottom surface of the reel spring provision portion 40; this leads to decrease of an efficiency of the welding step.

Figure 6:
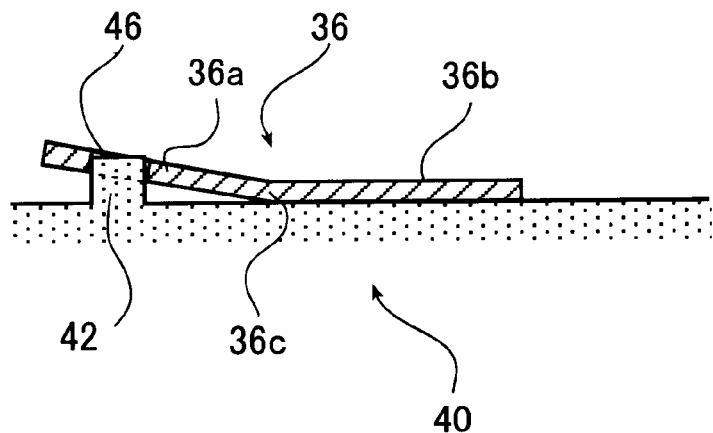
FIG. 6 is a cross-sectional schematic view showing a condition of a reel spring in which a reel spring of DVC-S type is provided in a cassette case.

However, according to the present invention, since the fixing portion 10a is stably placed in a manner that it contacts the bottom surface of the reel spring provision portion 40, as shown in FIG. 2, the upper half boss 42 can not be released from the boss hole 12, as shown in FIG. 6. This will ensure that the reel spring 10 is not dislocated from the appropriate position in the cassette case during the transportation to the welding step and has the fixing portion 10a also stably positioned on the bottom surface of the reel spring provision portion 40 during the welding step so that it is not necessary to do extra work to hold the fixing portion 10a to keep contact with the bottom surface of the reel spring provision 40 as has been done with the conventional reel spring 36 whereupon work efficiency of the welding step is improved over that of the conventional welding step.

With reference to the reel spring 10 according to the present invention, the length of the fixing portion 10a is longer than that of the arm portion 10b; the difference therebetween is from 1 mm to 5 mm.

If the above difference is designed to be less than 1 mm, then, as shown in FIG. 1B, since the reel spring 10 is chamfered off in a triangular and circular forms and is provided with the boss hole 12, the portion of gravity center of the reel spring 10 is not necessarily positioned in the region of the fixing portion 10a but rather in the vicinity of the bending portion 10c so that the fixing portion 10a may comes out of balance due to small vibration or unevenness of the bottom surface of the reel spring provision portion 40 to be lifted up from the bottom surface of the reel spring provision portion 40. For this reason, the position of the gravity center of the reel spring 10 is to be positioned at least in the region of the fixing portion 10a from the bending portion 10c as a border.

Figure 5:
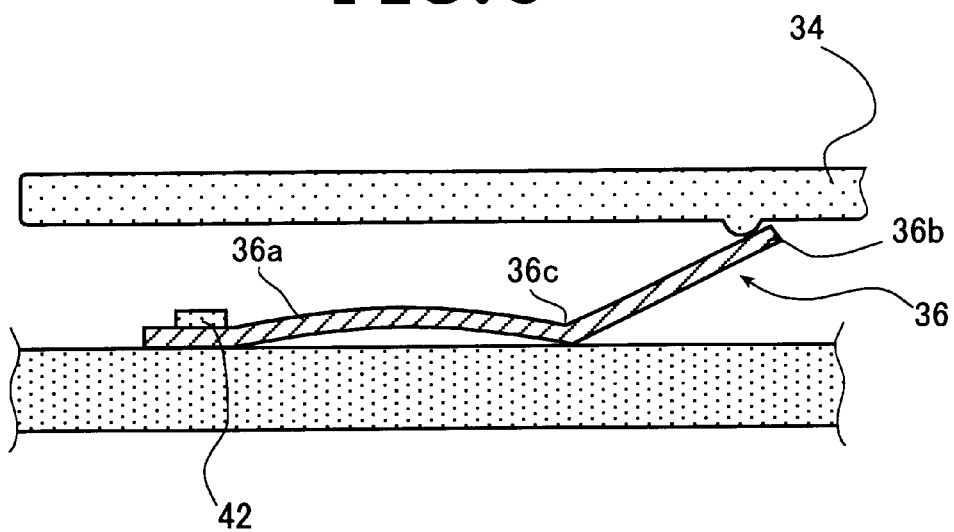
FIG. 5 is a cross-sectional schematic view showing a deformation condition of the reel spring when the reel spring shown in FIG. 4A forces on a reel.

The difference between the length of the fixing portion 10a and the length of the arm portion 10b is defined as being 5 mm or less because, if the difference is over 5 mm, the arm portion gets short in comparison with those of other modified reel springs within a range of a specified urging force and the urging force gets more variable by means of an individual variation of mass produced reel springs, for example, the variation of the bending angle of the bending portion, whereby a specified urging force can not be obtained. Moreover, if the difference is over 5 mm, as described above, when the reel is provided with the urging force, a part of the fixing portion 10a is bent to be lifted as shown in FIG. 5 so that it will be difficult to generate a specified urging force. Furthermore, spring rate of the reel spring 10 is formulated by the length of the arm portion 10b to the minus third power so that, if the difference between the length of the fixing portion 10a and the length of the arm portion 10b is longer than 5 mm, the length of the arm portion becomes shorter whereby the spring rate increases sharply and it becomes difficult to maintain the spring modulus within a specified amount so as to exert a specified urging force even if the plate thickness or a bending angle of the bending portion 10c of the reel spring 10 is designed to be changed. In addition, variation of the spring rate generated based on variation of the position of the bending portion 10c becomes larger as the length of the arm portion 10b becomes shorter whereby it becomes difficult to maintain the specified urging force within an allowable range.

As described above, the present invention is characterized in that the length of the fixing portion 10a is longer than the length of the arm portion 10b by from 1 mm to 5 mm; however, in order to exert the effect of the present invention more conspicuously, it is preferable that the length of the fixing portion 10a is longer than the length of the arm portion 10b by from 2 mm to 3 mm.

With reference to such reel spring according to the present invention, an example of specified dimensions will be described below.

The magnetic tape cassette is of digital video cassette L type (DVC-L). A reel spring 10 for use in this digital video cassette has a plate thickness of 0.2 mm, the length of the arm portion 10b of 19 mm and the length of the fixing portion 10a of 21 mm which is longer than the length of the arm portion 10b by 2 mm. Accordingly, the fixing portion 10a contacts the bottom surface of the reel spring provision portion 40 to be engaged to the upper half boss 42. The bending angle of the bending portion 10c is 16 degrees and the ratio of the length of the fixing portion 10a to the height of the upper half boss 42 is 9.5.

On the other hand, the conventional reel spring 36 has a plate thickness of 0.25 mm, the length of the arm portion 36b of 22.5 mm and the length of the fixing portion 36a of 17.5 mm which is shorter than the arm portion 36b by 5 mm. The bending angle at the bending portion 10c is 11 degrees. In this case, the fixing portion 36a is lifted up from the bottom surface of the reel spring provision portion 40 and the height of the boss hole 46 from the bottom surface exceeds the height of the upper half boss 42 of 2 mm whereby the boss hole 46 can not be caught by the upper half boss 42.

The length of the arm portion 10b of the reel spring 10 according to the present invention is shorter than that of the arm portion 36b of the conventional reel spring 36 by 3.5 mm so that, in order to generate the specified urging force, the plate thickness is decreased from 0.25 mm to 0.2 mm and also the bending angle is finely adjusted to change from 11 degrees to 16 degrees. In this case, the material for use in the reel spring is SUS 304.

The reel spring of the magnetic tape cassette and the magnetic tape cassette according to the present invention have been described above in detail. Of course, the present invention is not limited to the above described embodiments, and it is possible to effect a variety of improvements or modifications without departing from the scope and the spirit of the present invention.

Industrial Applicability

The reel spring of the magnetic tape cassette according to the present invention changes the position of the bending portion of the conventional reel spring to increase the length of the fixing portion allowing it to be longer than that of the arm portion by from 1 mm to 5 mm whereupon, when it is provided in an appropriate position, the fixing portion is stably placed keeping in contact with the bottom surface of the cassette case; hence, it is not necessary to take the trouble to keep the fixing portion in contact with the bottom surface of the cassette case as has been conventionally done, welding operation at the time of welding the reel spring is performed in a smooth manner and, moreover, since not only the fixing portion contacts the bottom surface of the cassette case, but also the reel spring is engaged to the boss of the cassette by allowing the boss of the cassette to get through the boss hole of the reel spring, the reel spring is not dislocated from the appropriate position by the vibration or the like while the cassette case is transported to the welding step so that the welding operation can be started right after the cassette case is transported to the welding step. This will increase the efficiency of the welding operation and, as a result, lead to enhancement of the production efficiency of the magnetic tape cassette.

What is claimed is:

1. A reel spring for use in a magnetic tape cassette having a cassette case and a pair of reels wound with a magnetic tape and rotatably provided in said cassette case, said reel spring for forcing one of said pair of reels in an axial direction of rotation, comprising:

a fixing portion for being fixed to said cassette case, said fixing portion having a boss hole for being engaged to a boss of the cassette case;

an arm portion which forces on said one of said reels in the axial direction of rotation; and a bending portion to form an L-like shape provided between said fixing portion and said arm portion, wherein a ratio of a length of said fixing portion to a height of the boss is equal to or more than 4.0, and wherein said length of said fixing portion is longer than a length of said arm portion by from 1 mm to 5 mm.

2. The reel spring for use in the magnetic tape cassette according to claim 1, wherein the length of said fixing portion is longer than that of said arm portion by from 2 mm to 3 mm.

3. The reel spring for use in the magnetic tape cassette according to claim 1 or 2, wherein a position of gravity center of said reel spring is positioned at least in a region of said fixing portion from said bending portion as a border.

4. The reel spring for use in the magnetic tape cassette according to any one of claims 1 to 2, wherein at least one of ends of said fixing portion and said arm portion is chamfered off.

5. The reel spring for use in the magnetic tape cassette according to any one of claims 1 to 2, wherein said reel spring is employed in a pair, and each reel spring of the pair forces each of said pair of reels.

6. The reel spring for use in the magnetic tape cassette according to claim 3, wherein at least one of ends of said fixing portion and said arm portion is chamfered off.

7. The reel spring for use in the magnetic tape cassette according to claim 6, wherein said reel spring is employed in a pair, and each reel spring of the pair forces each of said pair of reels.

8. The reel spring for use in the magnetic tape cassette according to claim 3, wherein said reel spring is employed in a pair, and each reel spring of the pair forces each of said pair of reels.

9. A magnetic tape cassette, comprising:

a cassette case;

a pair of reels wound with a magnetic tape and rotatably provided in said cassette case; and a pair of reel springs disposed to the cassette case for forcing each of the pair of reels in an axial direction of rotation, said cassette case having a pair of bosses for disposal of the pair of reel springs, each of said pair of reel springs comprising:

a fixing portion for being fixed to said cassette case, said fixing portion having a boss hole for being engaged to one of the pair of bosses of the cassette case to form a fixing end when said fixing portion is fixed to said cassette case;

an arm portion for forcing on each of said reels in the axial direction of rotation; and a bending portion to form an L-like shape provided between said fixing portion and said arm portion, wherein a ratio of a length of said fixing portion to a height of the boss is equal to or more than 4.0, and wherein said length of said fixing portion is longer than a length of said arm portion by from 1 mm to 5 mm.

* * * * *